US012608312B2

(12) United States Patent
Hsieh et al.

(10) Patent No.: US 12,608,312 B2
(45) Date of Patent: Apr. 21, 2026

(54) DATA ACCESS CONTROL METHOD OF MEMORY CARD AND COMPUTER SYSTEM

(71) Applicant: GENESYS LOGIC, INC., New Taipei City (TW)

(72) Inventors: Wen-Teng Hsieh, New Taipei City (TW); Shi-Chin Lee, New Taipei City (TW); Chi-Hsuan Tu, New Taipei City (TW)

(73) Assignee: GENESYS LOGIC, INC., New Taipei City (TW)

( * ) Notice: Subject to any disclaimer, the term of this patent is extended or adjusted under 35 U.S.C. 154(b) by 10 days.

(21) Appl. No.: 19/002,788

(22) Filed: Dec. 27, 2024

(65) Prior Publication Data

US 2025/0291716 A1 Sep. 18, 2025

Related U.S. Application Data

(60) Provisional application No. 63/564,509, filed on Mar. 13, 2024.

(30) Foreign Application Priority Data

Nov. 1, 2024 (TW) .................................. 113141877

(51) Int. Cl.
*G06F 12/02* (2006.01)
(52) U.S. Cl.
CPC .................................. *G06F 12/0246* (2013.01)
(58) Field of Classification Search
CPC .................................................. G06F 12/0246
See application file for complete search history.

(56) References Cited

U.S. PATENT DOCUMENTS 12,450,013 B1 * 10/2025 Dubey ..................... G06F 3/061
2003/0041187 A1 * 2/2003 Watanabe ............... G06F 21/82
710/10

(Continued)

FOREIGN PATENT DOCUMENTS

CN 104466470 3/2015
TW 202044054 12/2020

(Continued)

OTHER PUBLICATIONS

SD Association, SD Express Memory Cards with PCIe and NVMe Interfaces, Jun. 2020, Available at: https://www.sdcard.org/pdf/SD_Cards_8_0_WhitePaper20200515.pdf (Year: 2020).*

(Continued)

*Primary Examiner* — Ryan Bertram
(74) *Attorney, Agent, or Firm* — JCIPRNET

(57) ABSTRACT

A data access control method of a memory card and a computer system are provided. The computer system detects whether a memory card supports a first communication protocol version and a second communication protocol version. When the memory card supports the second communication protocol version, a access protection setting of the memory card is stored according to the first communication protocol version through a first driver. The access protection setting is used to restrict access to the memory card. The computer system unmounts the first driver. A disk corresponding to the memory card is set in an operating system of the computer system according to the access protection setting through a disk configuration service in 10 the computer system. The disk configuration service runs on the operating system, and the disk is configured with the access protection setting.

20 Claims, 7 Drawing Sheets

(56)           References Cited

U.S. PATENT DOCUMENTS

| | | | |
|---|---|---|---|
| 2014/0156885 A1 | 6/2014 | Lian | |
| 2019/0220260 A1 | 7/2019 | Gutman et al. | |
| 2020/0250346 A1* | 8/2020 | Sasidharan | G06F 21/79 |
| 2020/0285598 A1* | 9/2020 | Shiau | G06F 13/409 |
| 2021/0064551 A1* | 3/2021 | Shiau | G06F 13/4221 |
| 2022/0413709 A1* | 12/2022 | Kato | G06F 3/0679 |
| 2023/0221887 A1* | 7/2023 | Fujimoto | G06F 3/0679 |
| | | | 711/154 |
| 2025/0190343 A1* | 6/2025 | Ono | G06F 12/00 |
| 2025/0208794 A1* | 6/2025 | Kato | G06F 3/061 |

FOREIGN PATENT DOCUMENTS

| | | |
|---|---|---|
| TW | 202111546 | 3/2021 |
| TW | 202236107 | 9/2022 |

OTHER PUBLICATIONS

"Office Action of Taiwan Counterpart Application", issued on Jun. 3, 2025, p. 1-p. 3.

* cited by examiner

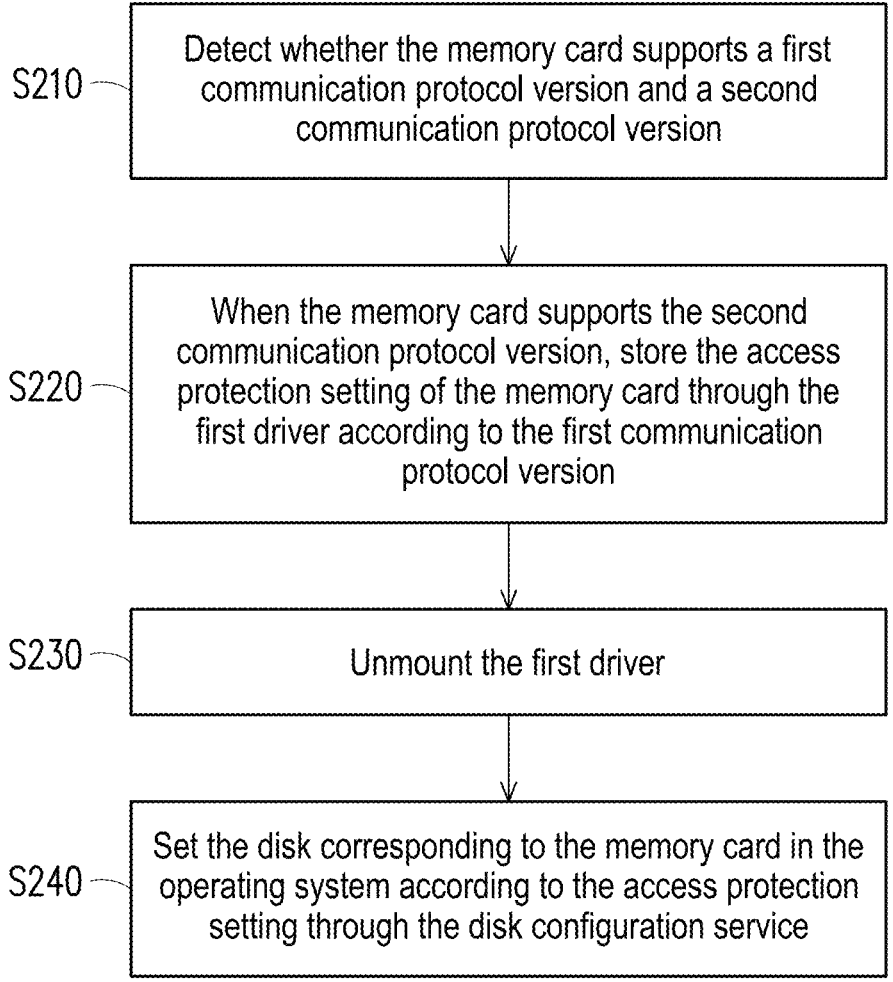

S210 — Detect whether the memory card supports a first communication protocol version and a second communication protocol version S220 — When the memory card supports the second communication protocol version, store the access protection setting of the memory card through the first driver according to the first communication protocol version S230 — Unmount the first driver S240 — Set the disk corresponding to the memory card in the operating system according to the access protection setting through the disk configuration service

FIG. 2

S405 — Insert the memory card of the third version or the fourth version

S410 — Create a disk

S420 — Create a disk volume

S425 — Remove the memory card

S430 — Release the disk volume

S440 — Release the disk

S605 — Insert the memory card of the seventh version

S610 — Switch the link

S620 — Create a disk

S630 — Create a disk volume

S635 — Remove the memory card

S640 — Release the disk volume

S650 — Release the disk

1

DATA ACCESS CONTROL METHOD OF MEMORY CARD AND COMPUTER SYSTEM

CROSS-REFERENCE TO RELATED APPLICATION

This application claims the priority benefit of U.S. provisional application Ser. No. 63/564,509, filed on Mar. 13, 2024 and Taiwan application serial no. 113141877, filed on Nov. 1, 2024. The entirety of each of the above-mentioned patent applications is hereby incorporated by reference herein and made a part of this specification.

BACKGROUND

Technical Field

The present invention relates to a data storage technology, and more particularly, to a data access control method of a memory card and a computer system.

Description of Related Art

A secure digital (SD) card is equipped with a mechanical switch, which may provide a write-protection function defined by the SD association. A user may operate a mechanical sliding member located on a side of the secure digital card to indicate whether the secure digital card is write-protected or not. A compatible driver may recognize that the sliding member is in a lock position to set an attribute of a disk to "read-only". However, if other drivers do not recognize the position of the sliding member, even if the sliding member is in the lock position, a computer system may still not provide the write-protection function for the disk corresponding to the secure digital card.

SUMMARY

The disclosure provides a data access control method of a memory card and a computer system, which may solve an issue that the existing mechanism may not provide a write-protection function.

A data access control method of a memory card according to the embodiment of the disclosure is suitable for a computer system to access the memory card. The data access control method of the memory card includes the following steps. The computer system detects whether the memory card supports a first communication protocol version and a second communication protocol version. When the memory card supports the second communication protocol version, the computer system stores an access protection setting of the memory card through a first driver according to the first communication protocol version. The access protection setting is used to restrict access to the memory card. The computer system unmounts the first driver. A disk corresponding to the memory card is set in an operating system of the computer system according to the access protection setting through a disk configuration service in the computer system. The disk configuration service runs on the operating system, and the disk is configured with the access protection setting.

A computer system according to the embodiment of the disclosure includes a storage, a control circuit, and a processor. The storage is used to store one or more program codes corresponding to a first driver and a disk configuration service. The disk configuration service runs on an operating system. The control circuit is used to be electrically connected to a memory card and detect a communication protocol version of the memory card. The processor is coupled to the storage, and is configured to load the program codes and the operating system to execute the following. It is detected whether the memory card supports a first communication protocol version and a second communication protocol version through the computer system. When the memory card supports the second communication protocol version, an access protection setting of the memory card is stored according to the first communication protocol version through a first driver. The access protection setting is used to restrict access to the memory card. The first driver is unmounted. A disk corresponding to the memory card is set in the operating system according to the access protection setting through the disk configuration service. The disk configuration service runs on the operating system, and the disk is configured with the access protection setting.

Based on the above, in the data access control method of the memory card and the computer system in the embodiments of the disclosure, the access protection setting may be retained before the first driver corresponding to the first communication protocol version is unmounted, to configure the access protection setting for the disk corresponding to the memory card. In this way, even if the subsequent second driver does not recognize that a sliding member on a mechanical switch is in a lock position, the write-protection function is still provided, and a write operation may not be performed on the memory card.

In order for the aforementioned features and advantages of the disclosure to be more comprehensible, embodiments accompanied with drawings are described in detail below.

BRIEF DESCRIPTION OF THE DRAWINGS

FIG. 2 is a flow chart of a data access control method of a memory card according to an embodiment of the disclosure.

DETAILED DESCRIPTION OF DISCLOSED EMBODIMENTS

Figure 1:
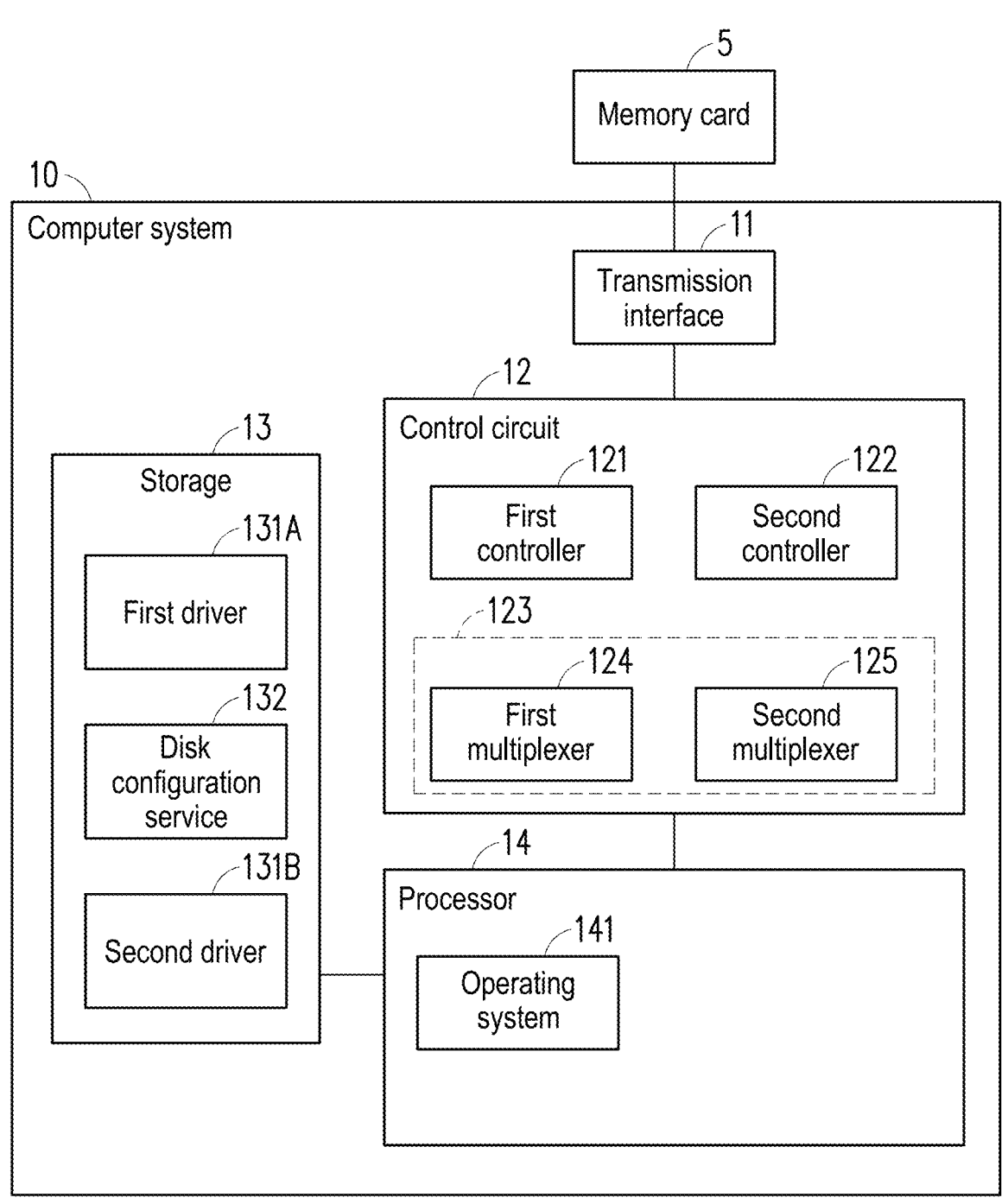
FIG. 1 is a block diagram of components of a memory card and a computer system according to an embodiment of the disclosure.

FIG. 1 is a block diagram of components of a memory card 5 and a computer system 10 according to an embodiment of the disclosure. Referring to FIG. 1, the memory card 5 may be a secure digital (SD) memory card or a memory card that supports standards defined by the SD association. The memory card 5 includes a mechanical switch. The mechanical switch includes a movable sliding member. The slider may move between a first position and a second position. The first position is, for example, a lock position. The lock position corresponds to access restrictions (e.g., write-protection or read-only). The second position is, for example, an unlock position. The unlock position corresponds to access permissions (e.g., write and read). The computer system 10 may be a desktop computer, a notebook computer, an all-in-one computer, a tablet computer, an intelligent assistant device, a smart home appliance, a vehicle system, a wearable device, or other electronic devices. The computer system 10 includes (but is not limited to) a transmission interface 11, a control circuit 12, a storage 13, and a processor 14.

The transmission interface 11 is used to be connected to the memory card 5. The transmission interface 11 may be an interface compliant with a secure digital memory card protocol, such as a secure digital memory card slot. The secure digital memory card protocol is, for example, the secure digital ultra high speed I (UHS I) (or referred to as the third version), UHS II (or referred to as the fourth version), SD-UHS III, or secure digital express (SD Express) (or referred to as the seventh version or the higher version), and the disclosure is not limited thereto.

The control circuit 12 is used to be electrically connected the memory card 5 through the transmission interface 11. The control circuit 12 may be a chip, a programmable controller, a general-purpose or special-purpose microprocessor, an application-specific integrated circuit (ASIC), or a digital circuit.

The control circuit 12 includes a first controller 121, a second controller 122, and a multiplex module 123. The first controller 121 is, for example, a secure digital host controller or a host-side controller that supports/is compliant with the second version of the secure digital (SD 2), the third version of the secure digital (SD 3), or the fourth version of the secure digital (SD 4). The second controller 122 is, for example, a peripheral component interconnect express (PCIe) controller, a non-volatile memory express (NVMe) controller, or a host-side controller that supports/is compliant with PCIe or NVMe. The multiplex module 123 is coupled to the transmission interface 11. In an embodiment, the multiplex module 123 may be selectively connected to the first controller 121, the second controller 122, and/or a system interface circuit 15. In an embodiment, the multiplex module 123 includes a first multiplexer 124 and a second multiplexer 125. The first multiplexer 124 is controlled by the first controller 121, and the second multiplexer 125 is controlled by the second controller 122.

In an embodiment, the transmission interface 11 and the control circuit 12 are built into the body of the computer system 10. In another embodiment, the transmission interface 11 and the control circuit 12 may be independently formed into a single hardware device, such as a card reader.

The storage 13 may be any type of fixed or removable random access memory (RAM), read-only memory (ROM), flash memory, hard disk drive (HDD), solid-state drive (SSD), or similar components. The storage 13 may be used to store program codes (e.g., program codes of a first driver 131A, a second driver 131B, and a disk configuration service 132), software modules, configurations, data, and/or files (e.g., an access protection setting or protection configuration, which will be described in detail in subsequent embodiments).

The processor 14 is coupled to the control circuit 12 and the storage 13. The processor 14 may be a central processing unit (CPU), a graphic processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components or a combination of the above components. In an embodiment, the processor 14 is used to execute all or a part of operations of the computer system 10, and may load and execute each of the program codes, software modules, files and/or data stored in the storage 13. In an embodiment, the processor 14 may load and execute an operating system (OS) 141. The operating system is, for example, Windows, MAC OS, Linux, or other systems.

The first driver 131A and the second driver 131B in this embodiment are, for example, drivers of the control circuit 12. The processor 14 may load program codes of the first driver 131A or the second driver 131B and execute the first driver 131A or the second driver 131B to control all or a part of the operations of the control circuit 12. The disk configuration service 132 is a software service, a component, or a process running on the operating system 141. The processor 14 may load program codes of the disk configuration service 132 and execute the disk configuration service 132. In the following, a method in the embodiment of the disclosure will be described with reference to various devices, components, and modules in the memory card 5 and the computer system 10. Each of the processes of the method may be adjusted according to an implementation situation, and the disclosure is not limited thereto.

FIG. 2 is a flow chart of a data access control method of a memory card according to an embodiment of the disclosure. Referring to FIG. 2, the processor 14 of the computer system 10 detects whether the memory card 5 supports a first communication protocol version and a second communication protocol version (step S210). When the memory card 5 is connected to the transmission interface 11, the control circuit 12 detects a communication protocol version that the memory card is running through a command inquiry, a pin, and/or power characteristics. In an embodiment, the communication protocol version may be the first communication protocol version, and this first communication protocol version may be a protocol version corresponding to a secure digital express (SD express) mode or a protocol version corresponding to a secure digital ultra capacity (SDUC) format. In another embodiment, the communication protocol version may be the second communication protocol version, and this second communication protocol version may be a protocol version corresponding to a secure digital mode and a protocol version corresponding to a secure digital extended capacity (SDXC), secure digital high capacity (SDHC), or secure digital standard capacity (SDSC) format.

Figure 3:
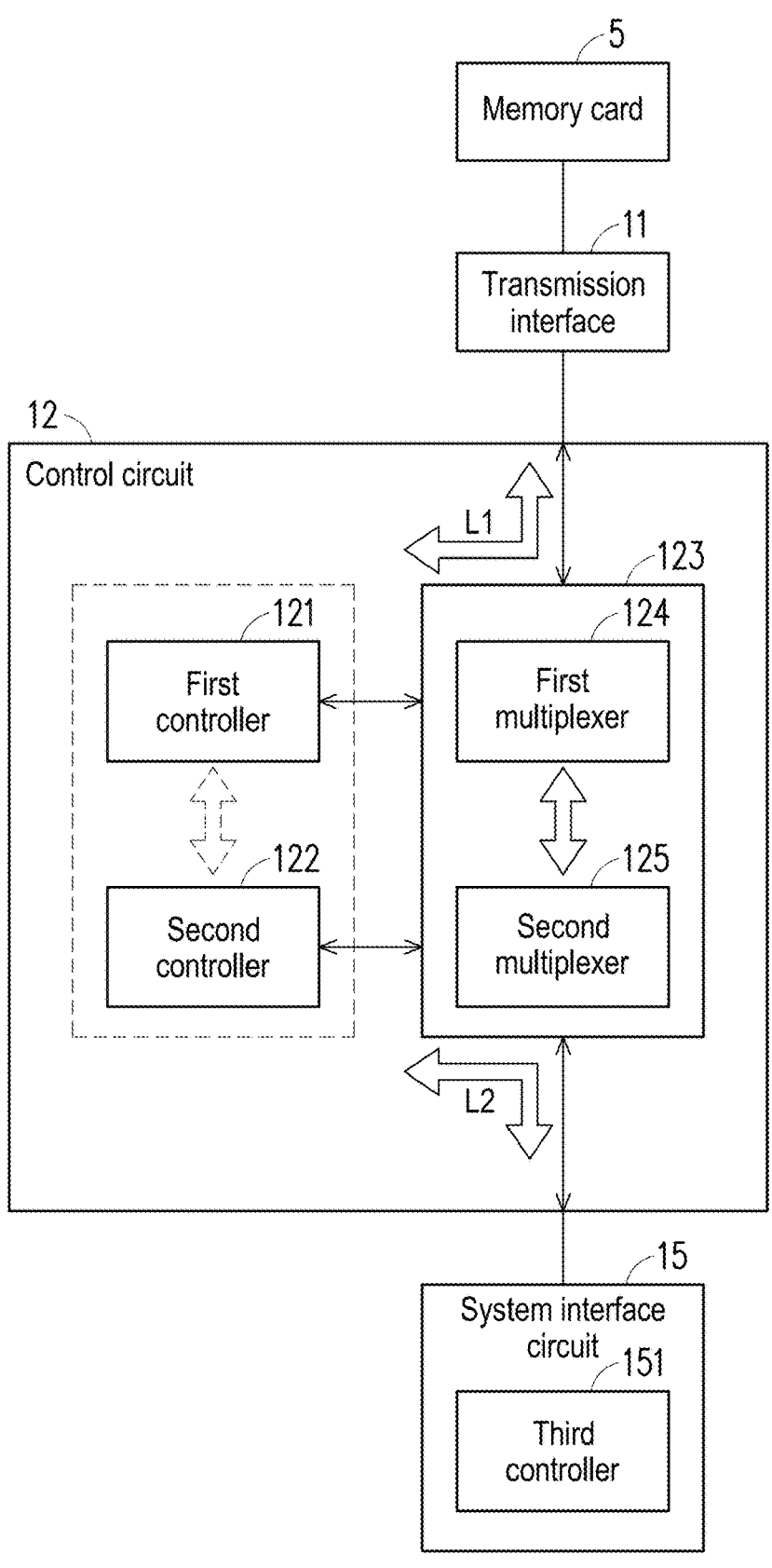
FIG. 3 is a schematic diagram of an operation of a first communication protocol version according to an embodiment of the disclosure.

FIG. 3 is a schematic diagram of an operation of a first communication protocol version according to an embodiment of the disclosure. Referring to FIG. 3, a communication protocol version of the memory card 5 is compliant with the first communication protocol version, for example. The first communication protocol version is the third version of the secure digital (SD 3) or the fourth version of the secure digital (SD 4) defined by a secure digital protocol. Referring to FIGS. 1 and 3, the processor 14 may control operations of the first controller 121 in FIG. 3 by executing the first driver 131A. In addition, the processor 14 may control operations of the second controller 122 in FIG. 3 by executing the second driver 131B. The system interface circuit 15 may be a system bus processing chip or circuit. In an embodiment, the system interface circuit 15 is coupled to the processor 14 in FIG. 1. In another embodiment, the processor 14 includes the system interface circuit 15. The system interface circuit 15 includes a third controller 151. The third controller 151 is, for example, a peripheral component interconnect express root complex component.

Figure 4:
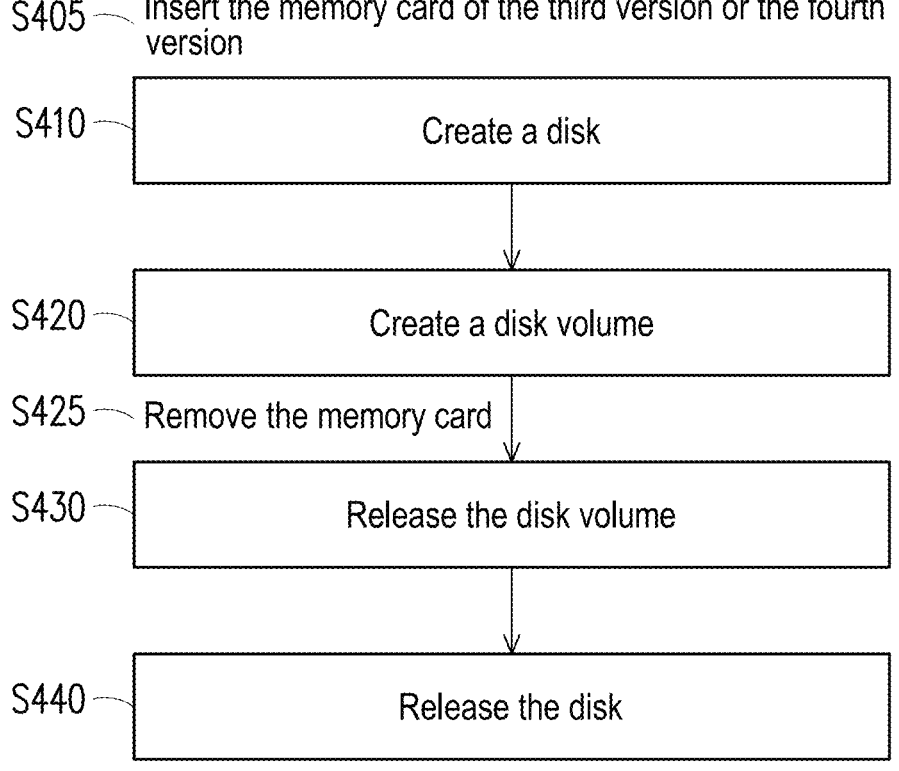
FIG. 4 is a flow chart of interaction between software and hardware of a first communication protocol version according to an embodiment of the disclosure.

FIG. 4 is a flow chart of interaction between software and hardware of a first communication protocol version according to an embodiment of the disclosure. Referring to FIGS. 3 and 4, such as in step S405, the memory card of the first communication protocol version is inserted. When the memory card 5 of the first communication protocol version is inserted into a slot of the transmission interface 11, the first controller 121 executes an initialization process (e.g., an SD express initialization (SDEI) process). The initialization process is, for example, that the control circuit 12 provides the power required for an operation of the memory card 5, and/or the control circuit 12 transmits operation commands or access commands to the memory card 5, so as to establish two-way communication between the control circuit 12 and the memory card 5. In a boot process of the computer system 10, the processor 14 may load program codes of a driver corresponding to the first controller 121. Then, the processor 14 may operate the first controller 121 by executing the first driver 131A. As shown in FIG. 3, the multiplex module 123 may establish a link L1 between the transmission interface 11 and the first controller 121, and may establish a link L2 between the second controller 122 and the system interface circuit 15. Then, a connection and communication between the memory card 5 and the computer system are established.

After step S405, steps S410 and S420 may be executed to create a disk and a disk volume. A service running on the operating system 141 may create a disk or a disk object corresponding to the memory card 5 in the computer system 10 (step S410), and create a corresponding disk volume or disk volume object (step S420). It is worth noting that the first controller 121 may determine the position of the sliding member in the mechanical switch of the memory card 5 through the command inquiry, the pin, and/or the power characteristics. When the first controller 121 detects that the sliding member is in the lock position, the first controller 121 may report back through a sense data query from a small computer system interface (SCSI) of the operating system 141. The processor 14 may set the disk as a read-only attribute or a write-protection attribute. Therefore, when receiving a write command triggered by the operating system 141, the first controller 121 may report an access error. When the memory card 5 of the first communication protocol version is removed from the slot of the transmission interface 11 (step S425), the service running on the operating system 141 may release the disk volume corresponding to the memory card 5 (step S430), and release the corresponding disk (step S440).

Figure 5:
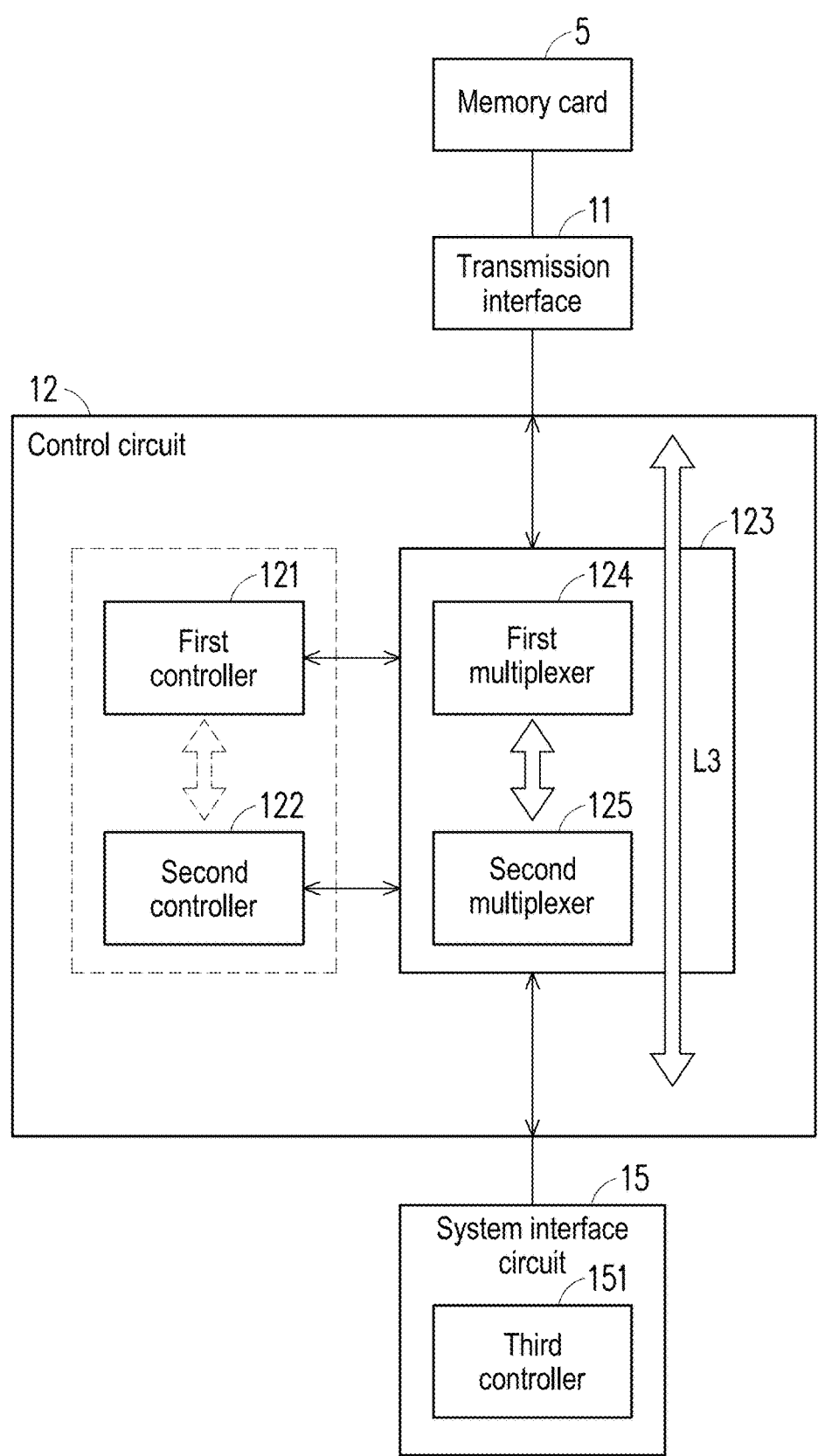
FIG. 5 is a schematic diagram of an operation of a second communication protocol version according to an embodiment of the disclosure.
Figure 6:
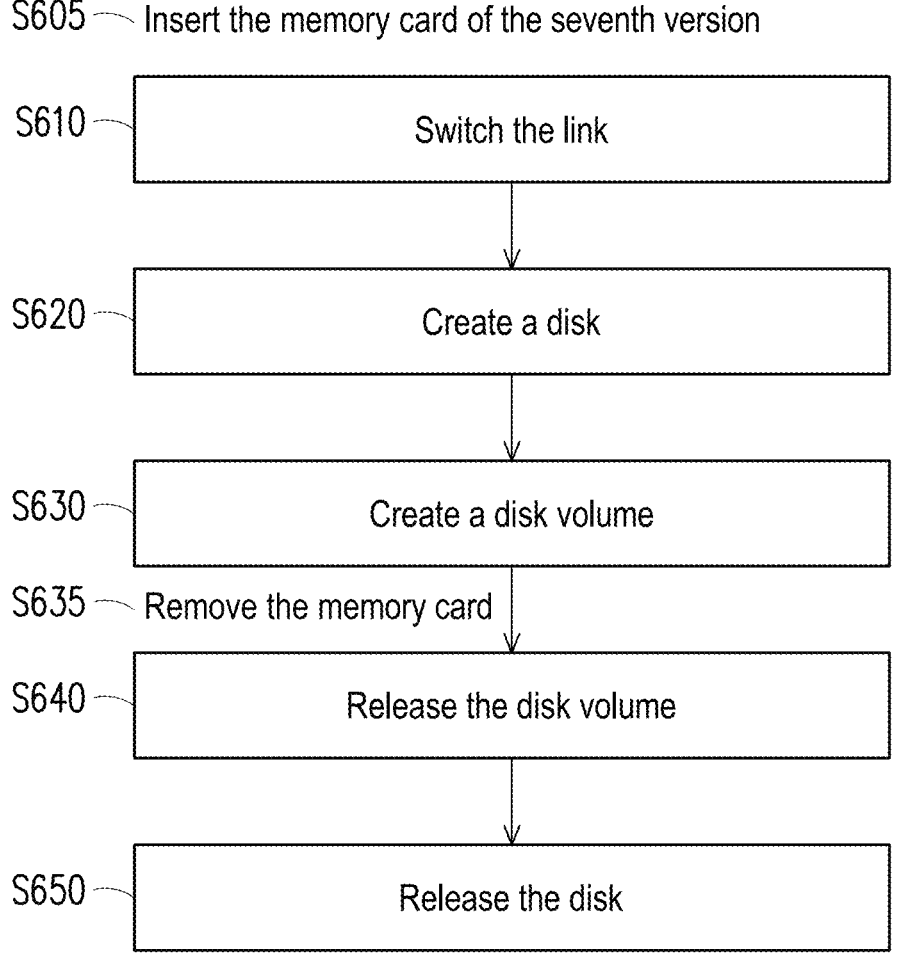
FIG. 6 is a flow chart of interaction between software and hardware of a second communication protocol version according to an embodiment of the disclosure.

FIG. 5 is a schematic diagram of an operation of a second communication protocol version according to an embodiment of the disclosure. FIG. 6 is a flow chart of interaction between software and hardware of a second communication protocol version according to an embodiment of the disclosure. It is assumed that the communication protocol version of the memory card 5 is compliant with the second communication protocol version. This second communication protocol version is the seventh version of the secure digital (SD 7) defined by the secure digital protocol or the higher/later version. Referring to FIGS. 5 and 6, such as in step S605, the memory card of the second communication protocol version is inserted. This second communication protocol version may be the seventh version of the secure digital. When the memory card 5 of the second communication protocol version is inserted into the slot of the transmission interface 11, a step of switching the link is performed (step S610). In this embodiment, after the memory card 5 of the second communication protocol version is inserted, the link L1 between the transmission interface 11 and the first controller 121 may also be established through the multiplex module 123 (as shown in FIG. 3), and the above-related steps such as determining the position of the sliding member in the mechanical switch of the memory card 5 through the command inquiry, the pin, and/or the power characteristics are executed through the first controller 121. After that, two-way communication between the processor 14 and the memory card 5 is established. For example, the multiplex module 123 switches a control/transmission link to a link L3 from the memory card 5 directly to the system interface circuit 15 through the transmission interface 11 as shown in FIG. 5. For example, PCIe retrains a link (that is, a link from the memory card 5 to the first controller 121 is switched to the link L3 from the memory card 5 directly to the system interface circuit 15).

During the above retraining process, the processor 14 unmounts the first driver 131A, for example, and loads a driver of the second controller 122 or the NVMe controller. This driver is, for example, the second driver 131B. In a preferred embodiment, the transmission bandwidth of the link L3 is greater than the transmission bandwidth of the link L1/L2 shown in FIG. 3. In the above embodiment, after the first driver 131A is unmounted, the second driver 131B will be loaded, which is taken as an example. In other preferred embodiments, the first driver 131A may also be unmounted after the second driver 131B is loaded. The disclosure does not impose any limitations here.

It is worth noting that after the first driver 131A is unmounted, the second controller 122 or the NVMe controller will not recognize/determine/detect the position of the sliding member in the mechanical switch of the memory card 5, and the second controller 122 or the NVMe controller will not record whether the memory card 5 has been indicated to be in a write-protected or read-only state. Therefore, when it is determined that the memory card 5 supports the second communication protocol version in the disclosure, the computer system 10 stores the access protection setting of the memory card 5 through the first driver 131A according to the first communication protocol version, and uses the disk configuration service 132 to set the disk corresponding to the memory card 5 in the operating system 141 of the computer system 10 according to the access protection setting, so that the disk is configured with the access protection setting. The above operations will be described in detail below.

After step S610, steps S620 and S630 may be executed to create the disk and the disk volume. Specifically, for behaviors of software services/processes/components, the service running on the operating system 141 of the processor 14 may create the disk corresponding to the memory card 5 (step S620), and create the corresponding disk volume (step S630). The disk corresponding to the memory card 5 is configured with the access protection setting. For example, when the access protection setting is set to read-only or write-protected, the disk corresponding to the memory card 5 is configured with read-only or write-protection. When the memory card 5 of the second communication protocol version (e.g., the seventh version of the secure digital) is removed from the slot of the transmission interface 11 (step S635), the service running on the operating system 141 may release the disk volume corresponding to the memory card 5 (step S640), and release the corresponding disk (step S650).

Referring to FIG. 2, when the memory card 5 supports the second communication protocol version, the processor 14 of the computer system 10 stores the access protection setting of the memory card 5 through the first driver 131A according to the first communication protocol version (step S220). Specifically, the access protection setting is used to restrict access to the memory card 5. The access protection setting is, for example, read-only and write-protection, or allows reading and writing. In an embodiment, the control circuit 12 may detect the access protection setting of the memory card 5 through the command inquiry, the pin, and/or the power characteristics. For example, when the sliding member in the mechanical switch of the memory card is in the lock position, the control circuit 12 may report that the access protection setting is read-only or write-protection. When the sliding member in the mechanical switch of the memory card is in the unlock position, the control circuit 12 may report that the access protection setting allows reading and writing.

In an embodiment, a register (not shown) of the control circuit 12 may store the access protection setting, and the access protection setting may be read from the register. In a preferred embodiment, for example, the first driver 131A is used to read the access protection setting from the register, and the first driver 131A is, for example, a driver of the above first controller 121. Then, the control circuit 12 may report the access protection setting to the processor 14, allowing the processor 14 to store the access protection setting in the storage 13.

In a preferred embodiment, the control circuit 12 in this embodiment may report the access protection setting to the processor 14, so that the processor 14 may read the access protection setting from the register through the first driver 131A, and then store the access protection setting in the storage 13. The above description is only one embodiment of the disclosure. All methods that allow the register of the control circuit 12 to store the access protection setting and the processor 14 to store the access protection setting in the storage 13 all fall within the spirit and scope of the disclosure. The disclosure does not impose any limitations here.

In an embodiment, the processor 14 corresponds the protection configuration to the access protection setting, for example, through the first driver 131A. This protection configuration is stored in a configuration database of the operating system 141. The configuration database is, for example, a registry of a Window system, a "plist" system of a MAC system, "daemons", or databases of other operating systems. The protection configuration may be in a numerical or literal form. For example, a value of "0" means that reading and writing are allowed, and a value of "1" means that it is write-protected or read-only. However, the disclosure is not limited thereto. In another embodiment, the protection configuration is stored in a system protection space in a file system or other file positions in a user space.

The processor 14 of the computer system 10 unmounts the first driver 131A (step S230). Specifically, when the communication protocol version of the memory card 5 is determined to be the protocol version corresponding to the secure digital express mode or the protocol version corresponding to the SDUC format, the link between the first controller 121 and the system bus is interrupted, and the link L3 is established, such as that shown in FIG. 5 (the link L3 does not pass through the first controller 121), while the processor 14 may unmount the first driver 131A. That is, when the communication protocol version of the memory card 5 is the protocol version corresponding to the secure digital express mode or the protocol version corresponding to the SDUC format (the second communication protocol version), the processor 14 will correspond the protection configuration to the access protection setting through the first driver 131A, and then the processor 14 will unmount the first driver 131A according to the communication protocol version, for example. Correspondingly, for example, the first controller 121 shown in FIG. 3 or 5 may be disabled or deactivated according to actual conditions.

The processor 14 of the computer system 10 sets the disk corresponding to the memory card 5 in the operating system 141 according to the access protection setting through the disk configuration service 132 (step S240). Specifically, the disk configuration service 132 runs on the operating system 141, and the disk corresponding to the memory card 5 is configured with the access protection setting. For example, when the access protection setting is read-only or write-protection, the disk corresponding to the memory card 5 is configured with read-only or write-protected. The processor 14 may also read the access protection setting through the disk configuration service 132. For example, the protection configuration corresponding to the access protection setting is read from the configuration database or other file positions. The processor 14 may set a disk attribute of the disk corresponding to the memory card 5 to correspond to the access protection setting through the disk configuration service 132. For example, when the disk (object) or the disk volume (object) corresponding to the memory card 5 is created, the disk configuration service 132 may set or change the disk attribute of the disk to the read-only attribute or the write-protection attribute.

In an embodiment, the processor 14 may determine through the disk configuration service 132 whether the disk attribute of the disk corresponding to the memory card 5 corresponds to the access protection setting. For example, when the disk volume (object) corresponding to the memory card 5 is created, the disk configuration service 132 may set or change a disk volume attribute of this disk volume to the read-only attribute or the write-protection attribute. In addition, the disk configuration service 132 will further determine whether the disk volume attribute matches the read-only attribute or the write-protection attribute. When the disk volume attribute of the disk does not match the read-only attribute or the write-protection attribute, the disk configuration service 132 may set or change the disk attribute of the disk to the read-only attribute or the write-protection attribute. When the disk attribute of the disk matches the read-only attribute or the write-protection attribute, the disk configuration service 132 may disable/stop/not reset the disk attribute. In addition, when the disk (object) corresponding to the memory card 5 is released from the operating system 141, the processor 14 may remove the stored access protection setting through the disk configuration service 132. For example, deleting or resetting the protection configuration from the configuration database or modifying the protection configuration becomes invalid.

As a result, without changing a hardware architecture of the computer system 10, in the disclosure, the access protection setting of the memory card 5 may be retained through the corresponding driver, and the disk (object) and/or the disk volume (object) may be configured based on the retained access protection setting through the disk configuration service 132, so that a write-protection function may be achieved for the memory card 5 that support specific protocol versions (e.g., the protocol version corresponding to the secure digital express mode or the protocol version corresponding to the SDUC format). In order to help readers understand the spirit of the disclosure in this case, another application scenario is described below.

Figure 7:
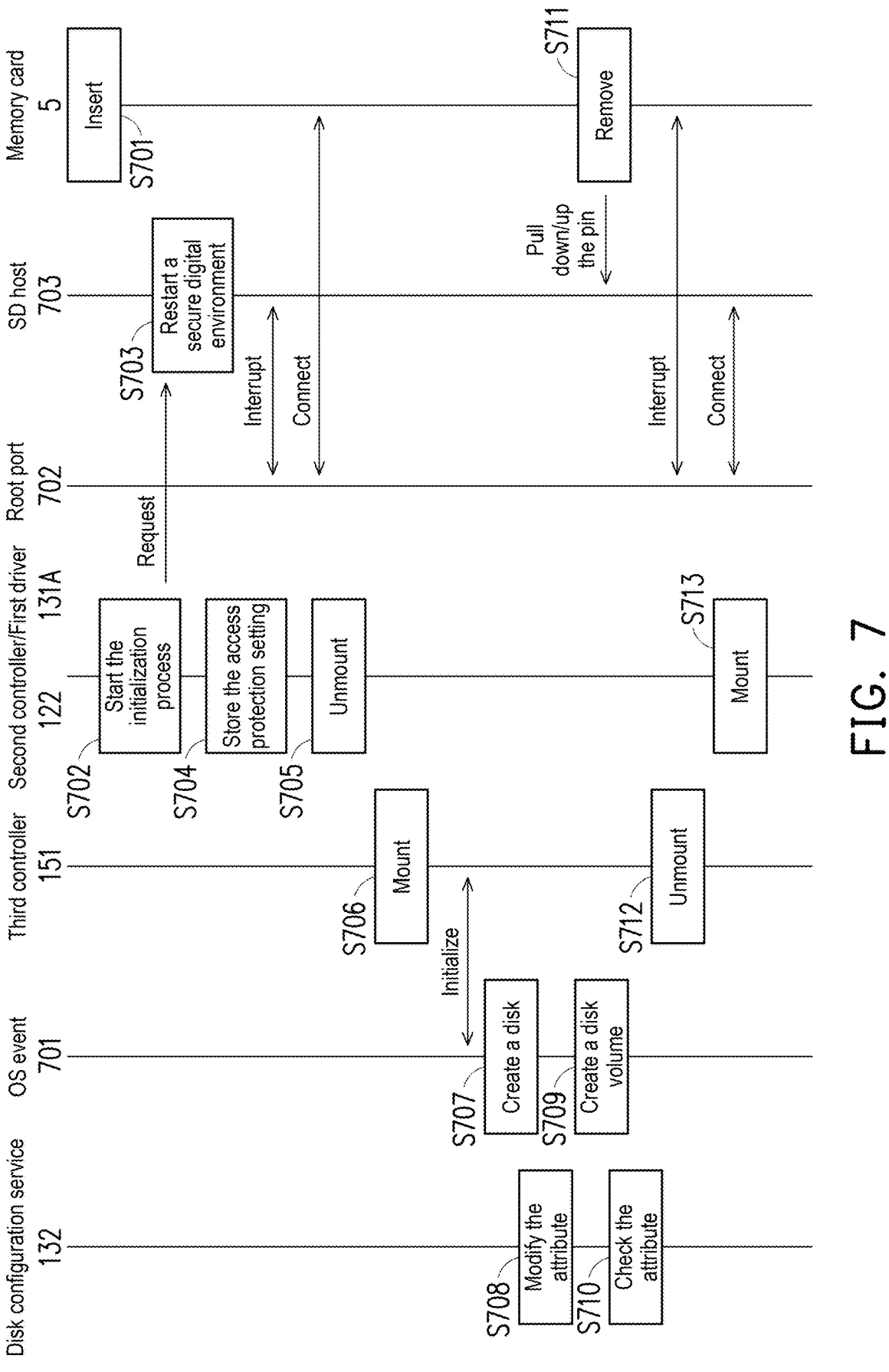
FIG. 7 is a flow chart of interaction between software of inserting and removing a memory card according to an embodiment of the disclosure.

FIG. 7 is a flow chart of interaction between software of inserting and removing the memory card 5 according to an embodiment of the disclosure. Referring to FIG. 7, it is assumed that the communication protocol version of the memory card 5 is the protocol version corresponding to the secure digital express mode or the protocol version corresponding to the SDUC format (i.e., the above second communication protocol version), and the sliding member in the mechanical switch thereof is in the lock position. An OS event 701 is a system event of the operating system 141. A root port 702 corresponds to the third controller 151 shown in FIG. 3 or 5. A SD host 703 corresponds to the control circuit 12.

After the memory card 5 is inserted into the transmission interface 11 (step S701), the first driver 131A starts the SD express initialization (SDEI) process (step S702). The first driver 131A may be the driver corresponding to the first controller 121 in FIG. 3 or 5. A transaction layer packet (TLP) carrying a memory write request is transmitted to the SD host 703. The control circuit 12 automatically starts a secure digital environment (SDE) (step S703). In addition, the access protection setting is stored (step S704) to retain the write-protected state corresponding to the lock position. The storage of the access protection setting is executed through the first driver 131A, for example.

As shown in FIG. 5, PCIe retrains. When the communication protocol version of the memory card 5 is the second communication protocol version, a link between the first controller 121 and the PCIe is interrupted, and the first driver 131A may be unmounted (step S705). On the other hand, after the link L3 in FIG. 5 is established, the processor 14 will mount the driver (e.g., the NVMe controller/driver) corresponding to the third controller 151 (step S706). Then, NVMe is initialized. In this embodiment, the second driver 131B is mounted after the first driver 131A is unmounted. In other preferred embodiments, the first driver 131A may be unmounted after the second driver 131B is mounted.

The OS event 701 indicates that an event of the disk (object) corresponding to the memory card 5 has been created (step S707). The disk configuration service 132 detects this event and checks information of this disk generated on a node of the PCIe device, a type of the NVMe device, and related information of the access protection setting, for example. The disk configuration service 132 modifies the disk attribute of this disk to the read-only attribute or the write-protection attribute based on the above information (step S708).

The OS event 701 indicates that an event of the disk volume (object) (or one or more partitions or disk codes corresponding to the disk created in step S707) corresponding to the disk created in step S707 has been created (step S709). The disk configuration service 132 detects this event and checks (again) whether the disk attribute of the disk matches the read-only attribute or the write-protection attribute (step S710), for example, whether the disk attribute is the same as the protection configuration of the configuration database. If the disk attribute does not match the read-only attribute or the write-protection attribute, the disk configuration service 132 modifies the disk attribute of the disk to the read-only attribute or the write-protection attribute. An order of step S707 and step S709 is not limited to that shown in FIG. 7, and the event of the disk volume (object) corresponding to the created disk may also occur first.

Then, the memory card 5 is removed from the transmission interface 11 (step S711). For example, a detection pin of the transmission interface 11 is pulled down/up or is not in a de-assert state. Next, since a link between the third controller 151 and PCIe is interrupted, the NVMe controller/driver may be unmounted (step S712). On the other hand, the processor 14 may then mount the driver corresponding to the first controller 121 (e.g., the first driver 131A) (step S713). The driver corresponding to the first controller 121 may be mounted after or before the link L1 as shown in FIG. 3 is established, for example.

In another preferred embodiment, referring to FIG. 5, when the memory card 5 is the second communication protocol version, through the control of the first controller 121 and the second controller 122, a direct link between the first multiplexer 121 and the second multiplexer 122 is, for example, interrupted. For example, the computer system 10 in this embodiment first establishes a link between the transmission interface 11, the first multiplexer 124, the first controller 121, the second controller 122, the second multiplexer 125, and the system interface circuit 15. Then, the computer system 10 first stores the access protection setting of the memory card 5 through the first driver 131A according to the first communication protocol version.

As mentioned above, after the storage of the access protection setting of the memory card 5 is completed, the computer system 10 would unmount the first driver 131A. The computer system 10 will also control the first multiplexer 124 and the second multiplexer 125 through the first controller 121 and the second controller 122 respectively, thereby establishing a direct link between the first multiplexer 124 and the second multiplexer 125. The above switching operation through the first multiplexer 124 and the second multiplexer 125 may, for example, establish the link L3 between the transmission interface 11, the first multiplexer, the second multiplexer, and the system interface circuit 15, and the second driver 131B may be loaded to allow the computer system to access the memory card by the link L3 through the second driver 131B. As a result, in this embodiment, the disk corresponding to the memory card 5 may be configured in the operating system 141 of the computer system 10 according to the access protection setting through the disk configuration service 132 in the computer system 10. In this way, the disk may be configured with the access protection setting. The transmission bandwidth of the link L3 is, for example, greater than the transmission bandwidths of L1 and L2.

Based on the above, in the access control method and the computer system in the embodiments of the disclosure, when the mechanical switch of the memory card has been instructed to be write-protected or read-only, the corresponding access protection setting may be retained. Even if the secure digital host controller is unmounted, the retained access protection setting may still be obtained through the disk configuration service running on the operating system, and the disk corresponding to the memory card may be set to be compliant with the disk attribute of this access protection setting. In this way, under the original hardware architecture of the computer system, the write-protection function may be provided for the memory card of the protocol version corresponding to the secure digital express mode or the protocol version corresponding to the SDUC format.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A data access control method of a memory card, suitable for a computer system to access the memory card, wherein the data access control method of the memory card comprises:

detecting, by the computer system, whether the memory card supports a first communication protocol version and a second communication protocol version;

when the memory card supports the second communication protocol version, storing, by the computer system, an access protection setting of the memory card through a first driver according to the first communication protocol version, wherein the access protection setting is used to restrict access to the memory card;

unmounting, by the computer system, the first driver; and setting a disk corresponding to the memory card in an operating system of the computer system according to the access protection setting through a disk configuration service in the computer system, wherein the disk configuration service runs on the operating system, and the disk is configured with the access protection setting.

2. The data access control method of the memory card according to claim 1, wherein the data access control method of the memory card further comprises:

loading, by the computer system, a second driver, and accessing the memory card through the second driver according to the second communication protocol version.

3. The data access control method of the memory card according to claim 1, wherein when the memory card supports the second communication protocol version, the computer system detects the access protection setting of the memory card by a first controller of a control circuit through the first driver according to the first communication protocol version and stores the access protection setting, and the control circuit controls a multiplex module of the control circuit to establish a link between the memory card and the computer system.

4. The data access control method of the memory card according to claim 3, wherein the control circuit further comprises a second controller, the multiplex module comprises a first multiplexer and a second multiplexer, and when the memory card supports the second communication protocol version, the first controller and the second controller respectively control the first multiplexer and the second multiplexer, allowing the memory card to be connected to the computer system through the first multiplexer and the second multiplexer.

5. The data access control method of the memory card according to claim 1, wherein a step of storing the access protection setting of the memory card comprises:

corresponding a protection configuration to the access protection setting, wherein the protection configuration is stored in a configuration database of the operating system.

6. The data access control method of the memory card according to claim 1, wherein a step of setting the disk corresponding to the memory card in the operating system comprises:

reading the access protection settings through the disk configuration service; and setting a disk attribute of the disk to correspond to the access protection setting through the disk configuration service.

7. The data access control method of the memory card according to claim 1, further comprises:

determining whether a disk attribute of the disk corresponds to the access protection setting; and when the disk attribute of the disk does not correspond to the access protection setting, setting the disk attribute of the disk to correspond to the access protection setting through the disk configuration service.

8. The data access control method of the memory card according to claim 1, further comprises:

when the disk corresponding to the memory card is released from the operating system, removing the stored access protection setting through the disk configuration service.

9. The data access control method of the memory card according to claim 1, wherein the access protection setting is write-protection.

10. The data access control method of the memory card according to claim 1, wherein the second communication protocol version is a protocol version corresponding to a secure digital express (SD express) mode or a protocol version corresponding to a secure digital ultra capacity (SDUC) format.

11. A computer system, comprising:

a storage used to store at least one program code corresponding to a first driver and a disk configuration service, wherein the disk configuration service runs on an operating system;

a control circuit used to be electrically connected to a memory card and detect a communication protocol version of the memory card; and a processor coupled to the storage and configured to load the at least one program code and the operating system to execute:

detecting whether the memory card supports a first communication protocol version and a second communication protocol version through the computer system;

when the memory card supports the second communication protocol version, storing an access protection setting of the memory card according to the first communication protocol version through a first driver, wherein the access protection setting is used to restrict access to the memory card;

unmounting the first driver; and setting a disk corresponding to the memory card in the operating system according to the access protection setting through the disk configuration service, wherein the disk configuration service runs on the operating system, and the disk is configured with the access protection setting.

12. The computer system according to claim 11, wherein the processor further executes:

loading a second driver, and accessing the memory card through the second driver according to the second communication protocol version.

13. The computer system according to claim 11, wherein the control circuit comprises a first controller and a multiplex module, and when the memory card supports the second communication protocol version, the processor further executes: detecting the access protection setting of the memory card by the first controller through the first driver according to the first communication protocol version and storing the access protection setting, and controlling, by the control circuit, the multiplex module to establish a link between the memory card and the computer system.

14. The computer system according to claim 13, wherein the control circuit further comprises a second controller, the multiplex module comprises a first multiplexer and a second multiplexer, and when the memory card supports the second communication protocol version, the first controller and the second controller respectively control the first multiplexer and the second multiplexer, allowing the memory card to be connected to the computer system through the first multiplexer and the second multiplexer.

15. The computer system according to claim 11, wherein the processor further executes:

corresponding a protection configuration to the access protection setting, wherein the protection configuration is stored in a configuration database of the operating system.

16. The computer system according to claim 11, wherein the processor further executes:

reading the access protection settings through the disk configuration service; and setting a disk attribute of the disk to correspond to the access protection setting through the disk configuration service.

17. The computer system according to claim 11, wherein the processor further executes:

determining whether a disk attribute of the disk corresponds to the access protection setting; and when the disk attribute of the disk does not correspond to the access protection setting, setting the disk attribute of the disk to correspond to the access protection setting through the disk configuration service.

18. The computer system according to claim 11, wherein the processor further executes:

when the disk corresponding to the memory card is released from the operating system, removing the stored access protection setting through the disk configuration service.

19. The computer system according to claim 11, wherein the access protection setting is write-protection.

20. The computer system according to claim 11, wherein the second communication protocol version is a protocol version corresponding to a secure digital express (SD express) mode or a protocol version corresponding to a secure digital ultra capacity (SDUC) format.

* * * * *